US009832208B1

(12) United States Patent
Adams et al.

(10) Patent No.: US 9,832,208 B1
(45) Date of Patent: Nov. 28, 2017

(54) SYSTEM AND METHODS OF PROVIDING SECURE MESSAGING ENVIRONMENT

(71) Applicant: Erasable, LLC, Northville, MI (US)

(72) Inventors: Wendell Adams, Portage, MI (US); Steven Kosbau, Northville, MI (US)

(73) Assignee: Erasable, LLC, Northville, MI (US)

( * ) Notice: Subject to any disclaimer, the term of this patent is extended or adjusted under 35 U.S.C. 154(b) by 74 days.

(21) Appl. No.: 14/961,951

(22) Filed: Dec. 8, 2015

Related U.S. Application Data

(60) Provisional application No. 62/096,084, filed on Dec. 23, 2014.

(51) Int. Cl.
H04L 29/06 (2006.01)

(52) U.S. Cl.
CPC ........ *H04L 63/123* (2013.01); *H04L 63/0435* (2013.01); *H04L 63/0442* (2013.01); *H04L 63/061* (2013.01); *H04L 63/0807* (2013.01)

(58) Field of Classification Search
None
See application file for complete search history.

(56) References Cited

U.S. PATENT DOCUMENTS

| 6,580,786 | B1* | 6/2003 | Yarlagadda | ....... G06F 17/30867 379/88.17 |
| 2006/0034456 | A1* | 2/2006 | McGough | ............. H04L 9/0844 380/30 |
| 2007/0130084 | A1* | 6/2007 | Kay | .................... G06Q 20/3674 705/67 |
| 2010/0223338 | A1* | 9/2010 | Hodes | .................. G06Q 10/107 709/206 |
| 2011/0035591 | A1* | 2/2011 | Dudziak | ............... H04L 63/045 713/168 |
| 2012/0311686 | A1* | 12/2012 | Medina | ............... H04L 63/0807 726/7 |
| 2015/0244520 | A1* | 8/2015 | Kariman | ............... H04L 9/0863 713/168 |
| 2015/0350247 | A1* | 12/2015 | Adler | .................... H04L 63/166 713/151 |

OTHER PUBLICATIONS

Olivarez-Giles, "Review: BitTorrent's Bleep Is a Messaging App Built for Secrecy", The Wall Street Journal (2015).
Screen Captures taken from snapchat.com (2017).

* cited by examiner

Primary Examiner — Michael R Vaughan
(74) Attorney, Agent, or Firm — Cahn & Samuels, LLP

(57) ABSTRACT

A method for providing a secure messaging environment includes providing a messaging environment in which two or more devices are connected via a network, each device having a client application that provides a graphical user interface for displaying messages within the messaging environment; logging-into the client application; encrypting user-specific information using a personal encryption key; creating a ticket, said ticket comprising a continuously-updated key and an optional expiration setting from a server; and calling the server, the call comprising the ticket and a target method.

16 Claims, 11 Drawing Sheets

SYSTEM AND METHODS OF PROVIDING SECURE MESSAGING ENVIRONMENT

This application claims priority of U.S. provisional patent application 62/096,084 filed in the U.S. Patent and Trademark Office on 23 Dec. 2014, the entirety of which is incorporated herein by reference.

FIELD OF INVENTION

The present invention is directed to a system and methods of providing a secure messaging environment between two or more devices via a computer network, thereby ensuring secure data transmission, storage, and exchange. Encrypted data stored on a server may be viewed by one or more users of the secure messaging environment and is removeable from the server and the messaging environment.

BACKGROUND AND SUMMARY OF INVENTION

According to one embodiment of the present invention, a method for providing a secure messaging environment is provided comprising providing a messaging environment in which two or more devices are connected via a network, each device having a client application that provides a graphical user interface for displaying messages within the messaging environment; logging-into the client application; encrypting user-specific information using a personal encryption key; creating a ticket, the ticket comprising a continuously-updated key and an optional expiration setting from a server; and calling the server. The call to the server may comprise the ticket and a target method.

According to another embodiment, a method for providing a secure messaging environment is provided. A messaging environment in which two or more devices are connected via a network is provided, each device having a client application that provides a graphical user interface for displaying data within the messaging environment. A ticket is created, the ticket comprising a continuously-updated encryption key and an optional expiration setting from a server. Data is transmitted to the messaging environment, wherein the data comprises data files, text or word processing files, notes, text messages, voice messages or calls, photos, videos, lists, spreadsheets, web links, or webpages. The data is encrypted. The encrypted data is stored on a database. A new encryption key is created by encrypting 1) user-specific information or a user personal key and 2) a record ID for the stored data. The new encryption key is updated with each transmission of data to the messaging environment, thereby creating the continuously-updated encryption key. The data is displayed in the messaging environment and a client graphical user interface on a user device, thereby providing a continually-encrypted exchange of data in the messaging environment.

According to another embodiment, a system for providing a secure messaging environment is provided. A server provides a messaging environment in which two or more devices are connected via a network, each device having a client application that provides a graphical user interface for displaying messages within the messaging environment. The server encrypts messages sent to the messaging environment and creates a continually-changing encryption key by encrypting user-specific information or a user personal key and a record ID for a stored encrypted message. At least one database stores encrypted messages from the server with each message having a separate record ID.

An advantage of at least one embodiment of the present invention is that tickets may be used with an Internet Protocol (IP) restriction. Thus, it is impossible to use the same ticket on a different network.

Another advantage of at least one embodiment of the present invention is that a ticket may comprise user-specific information. Thus, it is not possible to use the same ticket for a different user. A user must be logged-in as a ticket owner in order to use a ticket.

Yet another advantage of at least one embodiment of the present invention is that a ticket may be protected with an expiration setting. There is no chance to use an expired ticket.

Another advantage of at least one embodiment of the present invention is that there is no way to decrypt all data on database with a single encryption key. Even if a key were compromised, it may allow at best access to a single record, but nothing more.

Another advantage of at least one embodiment of the present invention is that, even if an unauthorized third party (e.g., hacker) gets access to a database or server files, the third party will not have an encryption key for a specific record.

Another advantage of at least one embodiment of the present invention is that a data encryption key may use fragmented keys that are continuously changing and connect one device to another device, allowing for real-time encryption and data removal with nothing being stored on either device. A fragmented key may be composed of user data, server data, and an instance to create a new key that will continuously change.

Yet another advantage of at least one embodiment of the present invention is that, even if unauthorized third parties are on the same network as a server, they will not have be able to obtain a second level encryption key, unless both user parameters and a specific record ID are known.

DETAILED DESCRIPTION OF INVENTION

In this detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated. Thus, the invention can include any variety of combinations and/or integrations of the embodiments described herein.

I. Messaging Environment

According to the present invention, a messaging environment is provided between two or more devices via a computer network (e.g., the Internet, wireless network). In specific embodiments, the devices may be an electronic or digital device including, but not limited to, a desktop computer, a laptop computer, a tablet computer, a smartphone, a gaming device, a wearable device (e.g., watch, sports band), any smart device, computer, tablet or phone having wireless access to the Internet, and the like. In a specific embodiment, the messaging environment and/or access thereto may be provided via a downloadable app.

In specific embodiments, the messaging environment may be synchronous or asynchronous. The messaging environment allows users of the devices to exchange data in the messaging environment. Data include, but are not limited to, data files, text or word processing files, text messages, voice messages or calls, notes, contacts, photos, videos, lists, spreadsheets, web links, webpages, and the like.

According to the present invention, a client (client-side or user-side application) on a user's device provides a graphical user interface for displaying data (e.g., one or more messages) in the messaging environment between two or more users. The client is in communication via the network with a server (server-side) and at least one database.

II. Overview

Figure 1:
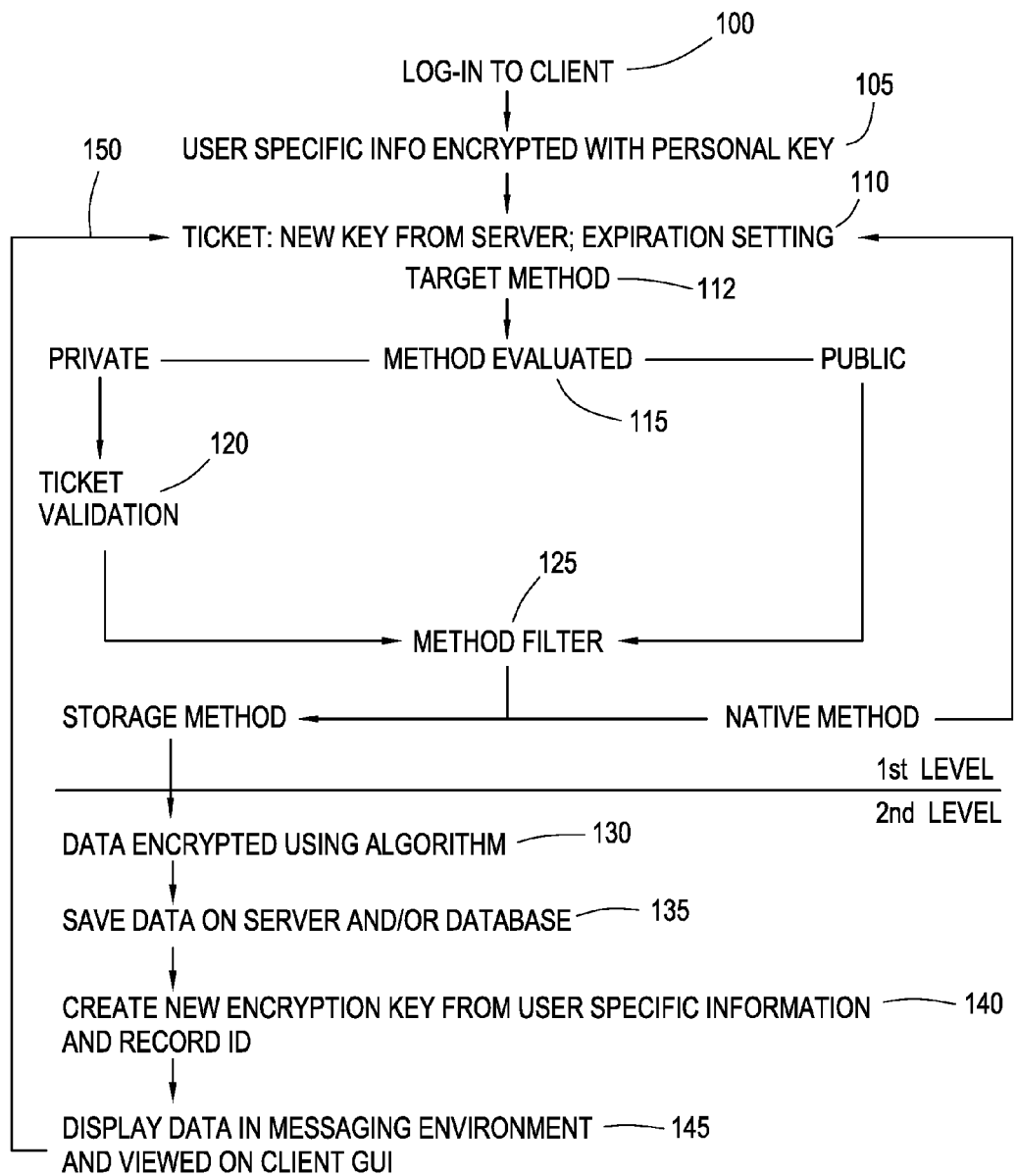
FIG. 1 is a flowchart of a method according to one embodiment of the present invention.

A method according to one embodiment of the present invention is illustrated in the flowchart of FIG. 1. A user logs into a client, 100. Each user has a personal encryption key, which in a specific embodiment does not change. User-specific information is encrypted using the personal encryption key, 105. Currently logged-in user-specific information may include at least one of a user ID, a user password, a user role, or any combination thereof.

The client prepares a ticket, 110, and calls the server: 1) every time a user logs into the client, and 2) every time the user sends and/or receives data (e.g., messages) in the messaging environment. Alternatively, or in addition thereto, a client may receive a ticket from the server.

The ticket may include a new, constantly-changing encryption key from the server as discussed below and an optional expiration setting. The call to the server includes the ticket and may also include a target method 112 (e.g., requesting an action). In specific embodiments, the ticket, or any part thereof, may comprise an encrypted string having numeric, alphabetical, and/or alphanumeric values or characters.

According to a specific embodiment of the present invention, the expiration setting may comprise a predefined period or event including, but not limited to, a time period, a logout, closing and/or reopening of an Inbox or a specific folder/icon, losing a network connection between the client and the server, or any combination thereof.

The client calls the server and the target method is evaluated to determine whether the call is public or private, 115.

If the call includes data sent from a user to the messaging environment, the call is private. The ticket from the client is validated by the server, 120. In specific embodiments, validation may comprise confirming the validity of at least one of the client Internet Protocol (IP) address, user-specific information, an expiration setting, whether the ticket is signed by the server, whether the ticket is in a valid format, or any combination thereof.

If the ticket is validated, the target method is filtered, 125; otherwise, if validation fails, the method is aborted. The target method may be filtered, for example, to determine whether it includes data to be stored.

If the call does not include data sent from the user to the messaging environment, the call is public. In specific embodiments, a public call may include encrypted user-specific information and information about the device on which a client resides. A public call is also filtered, 125.

If the call is public, a native method may be invoked. In specific embodiments, a native method may include confirming the user-specific information; determining the platform on which a client operates (e.g., iOS, Android); or confirming a user logging into a client, accessing a log-in screen, or navigating between screens in the graphical user interface. A native method may ensure that a user is logging in correctly and is not being spoofed.

If the call is private and includes a storage method (e.g., data to be stored), the data is encrypted. This filtering and encrypting may allow for storing, reading, and searching of encrypted data.

In specific embodiments, the data may be encrypted using an algorithm, 130, and stored on a server and/or at least one database, 135. The algorithm creates a new key by encrypting the currently logged-in user's personal key with a record ID for the stored data, 140. In specific embodiments, the record ID may include at least one of a server ID, database ID, network ID, or any combination thereof. Once encrypted and stored, the data may be displayed in the messaging environment, 145 from where it is viewed in the graphical user interface of a client (e.g., sender and receiver of a message). The new key identifies encrypted data and pulls it from the server and/or at least one database. Thus, each stored data is encrypted by a unique, newly-generated, constantly-changing key.

In a specific embodiment, the new key is forwarded to the client application, 150, and incorporated into a new ticket. The method may be repeated for each data (e.g., message) sent and/or received in the messaging environment, with each new (second, third, fourth, etc.) ticket being validated.

Thus, in specific embodiments, for each data or message transmitted in the messaging environment, two levels of encryption may occur: a first level using a personal encryption key, and a second level comprising a continually-changing key as data is sent, received, and viewed in the messaging environment.

In a specific embodiments, the user personal encryption key (e.g., first level) and/or each newly-generated encryption key (e.g., second level) may be saved using Apache SOLR™. Apache SOLR™ is a standalone enterprise search server with a REST-like API. Data may be put in ("indexed") via JSON, XML, CSV or binary over HTTP. One may initiate queries via HTTP GET and receive JSON, XML, CSV or binary results.

Any effective encryption methodology may be used in the present invention. In specific embodiments, a 2-level 256 bit Advanced Encryption Standard (AES) encryption algorithm (based on libmcrypt (mcrypt of php) may be utilized.

III. Graphical User Interface of Client

Figures 2, 3:
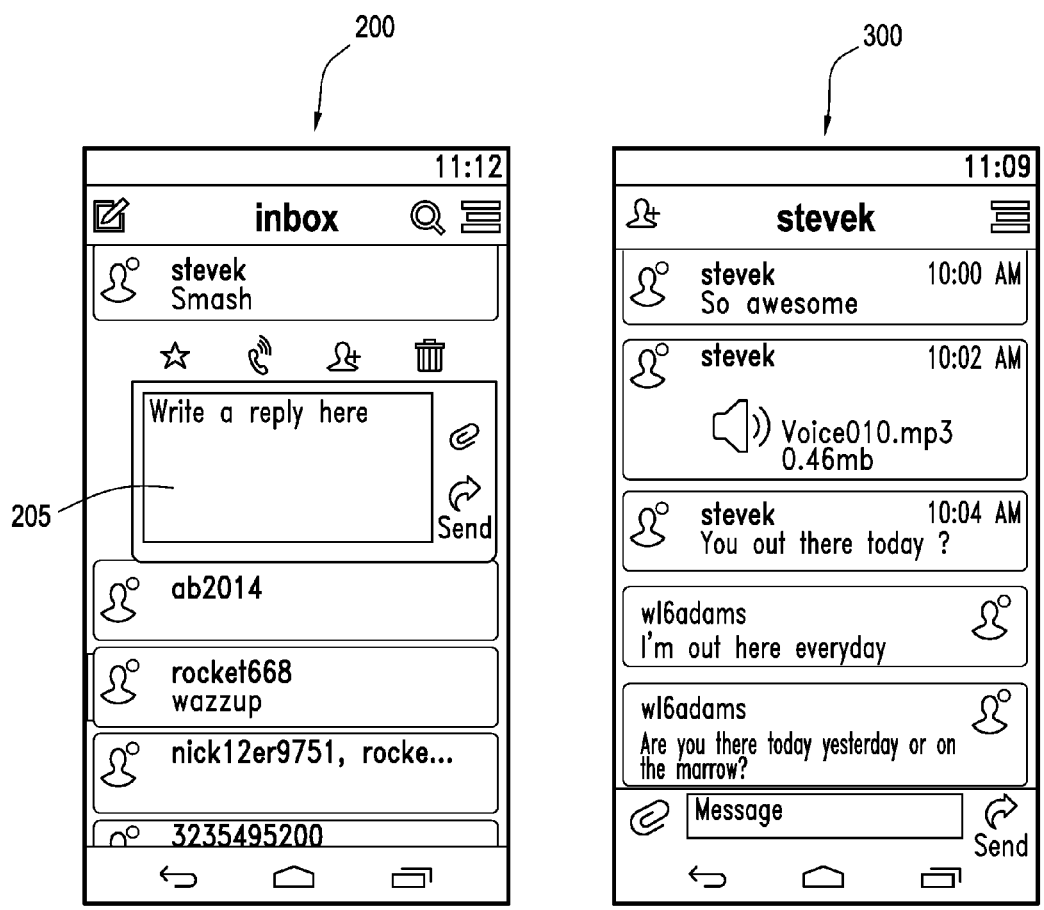
FIG. 2 is a screenshot of graphical user interface for displaying an Inbox and messaging area according to one embodiment of the present invention.
FIG. 3 is a screenshot of a messaging environment according to one embodiment of the present invention.

An Inbox 200 is displayed in the client graphical user interface according to one embodiment of the present invention, as illustrated in the screenshot of FIG. 2. In a specific embodiment, the Inbox 200 may serve as a default screen when a user logs into the client and may display a list of other users with whom the user has sent and/or received messages. The Inbox may have a messaging area 205 that allows for a quick message creation or reply from the user. A messaging environment 300 is illustrated in the screenshot of FIG. 3 and, in embodiments, may be a drill-down screen from the messaging area 205 shown in FIG. 2 to display a specific conversation (e.g., exchange of messages) between two or more users.

One or more screens of the client graphical user interface may also display icons that provide additional features, for example, a Contacts List, an Outbox or Sent Box, a Trash folder, or other specific functions such as "Favorites", "Phone", "Add Contacts" and the like.

IV. Specific Embodiments of Target Method Evaluation and Filtering

Figure 4:
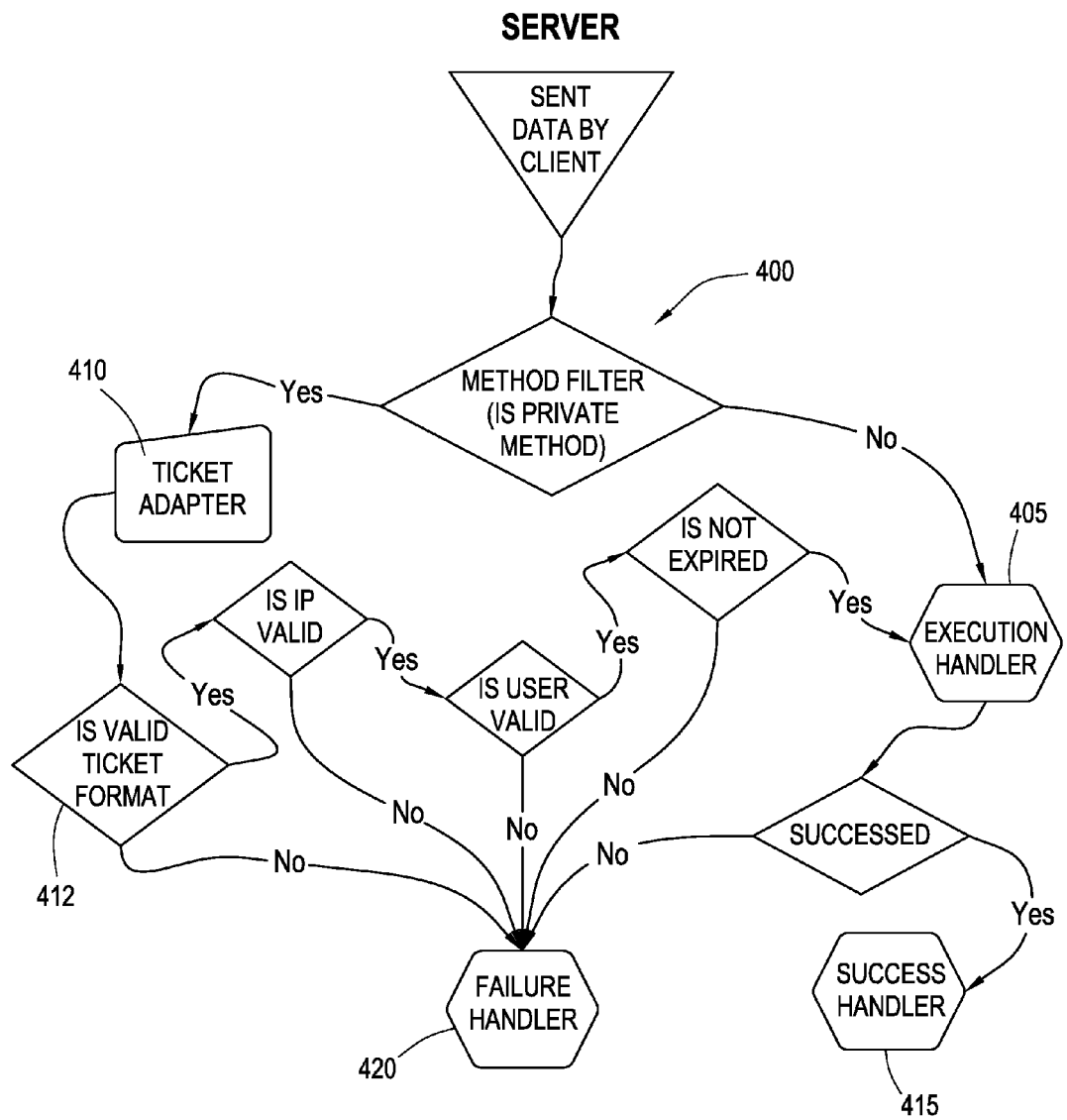
FIG. 4 is a flowchart of a method evaluation and ticket validation according to a specific embodiment of the present invention.

In a specific embodiment, a call comprising data from a client to the server is illustrated in FIG. 4. The method is evaluated, 400. A public method is sent directly to an Execution Handler, 405. If a method is private, it is forwarded to a Ticket Adapter, 410, which validates the ticket format, 412 (for example, by determining if the IP is valid, the user is valid, the ticket is expired). If the validation is successful, the ticket is forwarded to the Execution Handler, 405, and then a Success Handler, 415. If validation is unsuccessful, access to the messaging environment is denied (e.g., Failure Handler 420).

Figure 5:
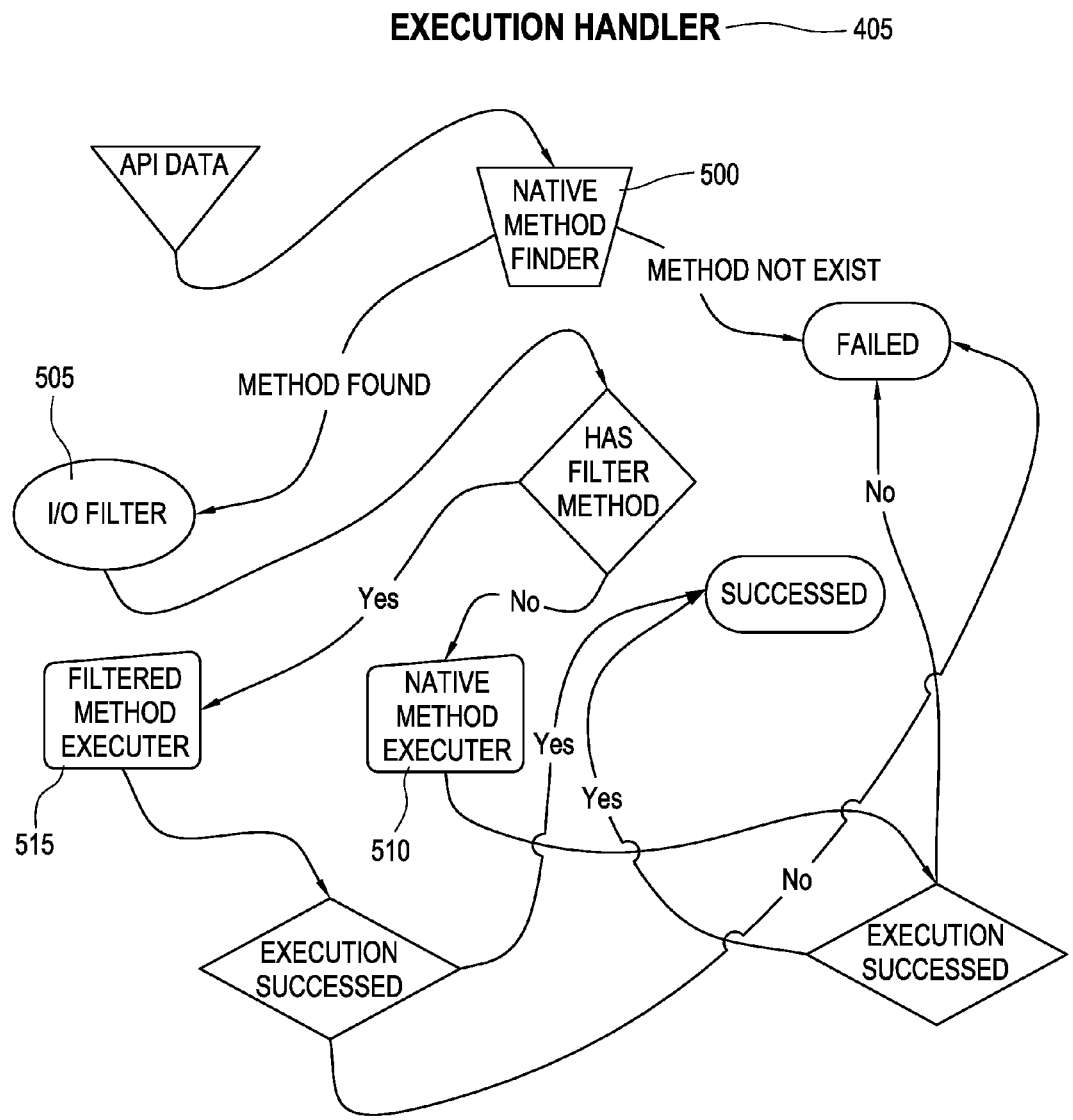
FIG. 5 is a flowchart of a filtering method according to a specific embodiment the present invention.

FIG. 5 illustrates the processes performed by the Execution Handler 405 of FIG. 4. A target method is analyzed via Native Method Finder 500. If the method is public, the method is filtered (via an Input/Output filter 505) and a native method is executed (via Native Method Executer 510). If the method is private, a storage filter method is executed (via Filtered Method Executer 515) and the data is encrypted and stored as discussed above.

Figure 6:
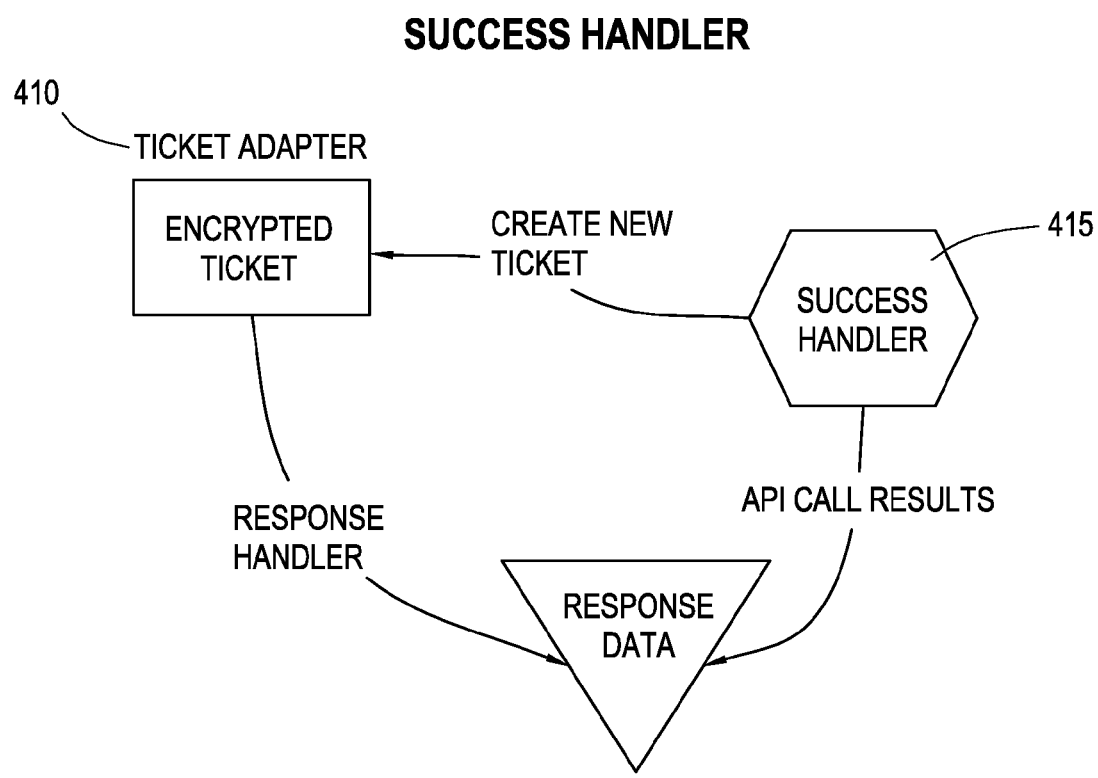
FIG. 6 is a flowchart of new ticket creation according to a specific embodiment of the present invention.

After method evaluation and filtering, a new ticket may be created, as illustrated in FIG. 6. A Success Handler 415 creates a new (second, third, etc.) ticket for a client via the Ticket Adapter 410. In a specific embodiment, the Response Handler may be code or a module that instructs how to handle data that is sent to the messaging environment. The Response Data comprises the data or message content. Everything is encrypted as it progresses to the messaging environment.

V. Clearing Data from the Server and Messaging Environment

According to the present invention, data (e.g. messages) in the messaging environment may be removed and cleared from the messaging environment and the server and/or at least one database.

Figure 7:
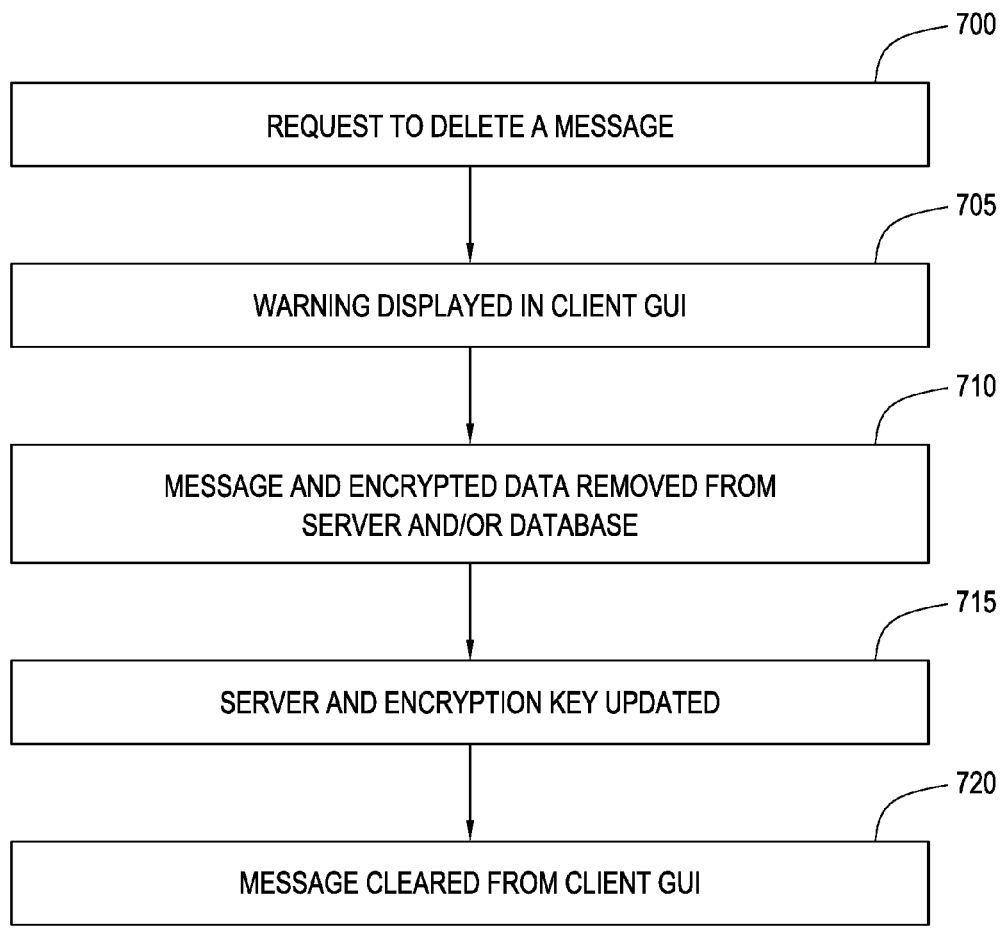
FIG. 7 is a flowchart of a method for clearing a message from the messaging environment according to one embodiment of the present invention.

As illustrated in the flowchart of FIG. 7, a user may request a specific message to be deleted, 700. The user may receive a warning, which in specific embodiments, may include a message, pop-up window, and/or sound, displayed or played in the client graphical user interface, 705. If approved, the message as well as the corresponding encrypted data are removed from the server and/or database, 710. The server and encryption key are updated, 715. Accordingly, the cleared message will not be capable of being viewed in the client graphical user interface (e.g., GUI of the sender and receiver), 720.

Figures 8A, 8B:
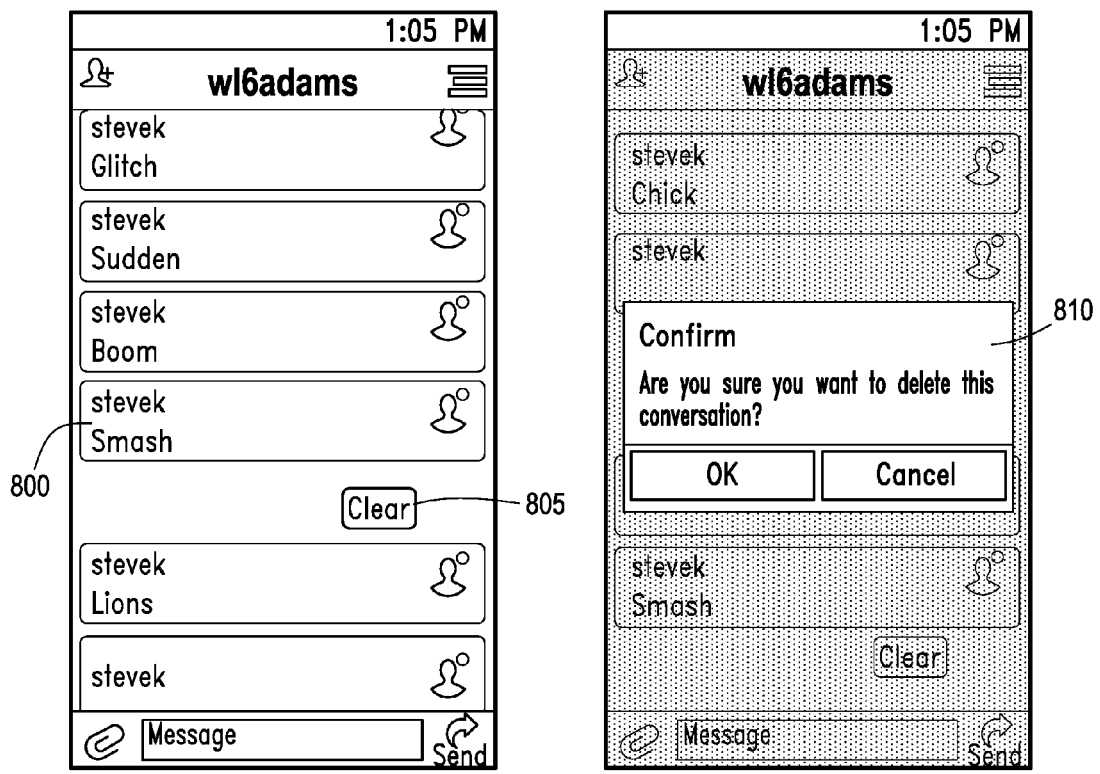
FIG. 8A is a screenshot of a messaging environment according to one embodiment of the present invention in which a user clears or deletes a message from the messaging environment.
FIG. 8B is a warning message or pop-up that is presented when a user deletes a message.

The method for clearing data (e.g., messages) is shown in the screenshots of FIGS. 8A-8B according to one embodiment of the present invention. As illustrated in FIG. 8A, a user may decide to clear or remove a message via the graphical user interface (e.g., by swiping or highlighting a specific message "Smash" 800 and tapping a "Clear" button or icon 805). In a specific embodiment, the user first may get a warning message 810, for example, audibly and/or visually by a pop-up window or message (as illustrated in FIG. 8B).

Figure 9:
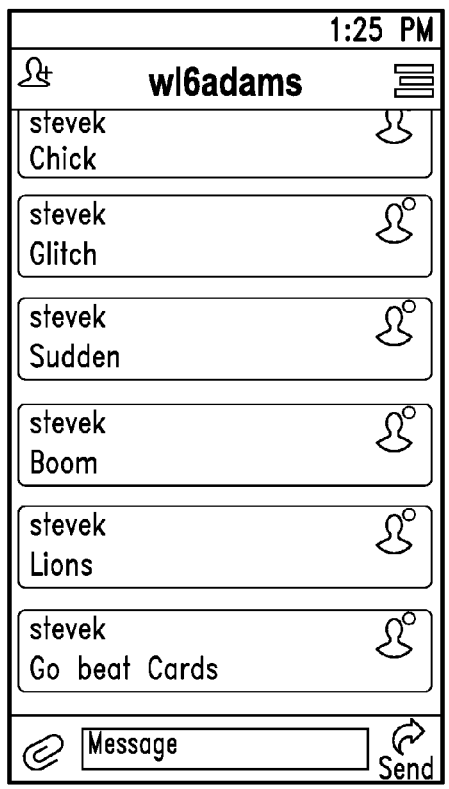
FIG. 9 is a screenshot of the messaging environment of FIG. 8A with the message cleared and removed from the messaging environment.
Figure 10:
FIG. 10 is a screenshot of a messaging environment according to one embodiment of the present invention.

If approved, the data will be cleared from the server and/or database, and the server and encryption key corresponding to the saved data will be updated. Accordingly, the message is removed not only from the server, but also from the messaging environment and from the GUI of user devices displaying that data (e.g., both sender and recipient), as illustrated in FIG. 9. Thus, a user no longer has access to the data. If a third party tried to spoof a user, the third party would be unable see the messages for the user. In the embodiment shown in FIG. 10, only encrypted characters are displayed; the message has been cleared and is inaccessible.

Since a user can only access the messaging environment when connected to the server, the message is cleared from the messaging environment and server at the same time, with nothing being stored. Accordingly, any cleared message is not recoverable.

VI. Real-Time Searching

Figure 11:
FIG. 11 is a screenshot of a real-time search of indexed data according to one embodiment of the present invention.

FIG. 11 is a screenshot of a real-time search of a messaging environment according to one embodiment of the present invention. As discussed above, each newly-generated key is saved along with the corresponding stored encrypted data (e.g., messages, contacts, and the like). According to the present invention, indexed searching of data is possible.

As illustrated, as a user begins to type in a search term in the client (e.g., "steve"), the server searches for encrypted data corresponding to that search term. In specific embodiments, Apache SOLR™ may be used to index data and respond to search queries.

VII. System Architecture and Computer Implementation

Figure 12:
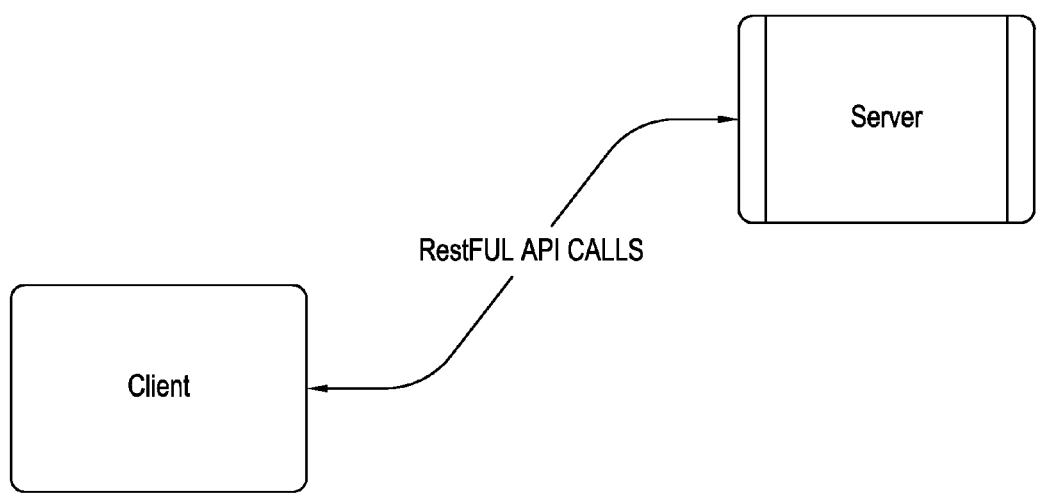
FIG. 12 is a schematic illustration of Application Programming Interface (API) calls in a client-server architecture according to an embodiment of the present invention.

According to an embodiment of the present invention, communication between a client and a server may be based on Representational State Transfer (REST or RESTful) Application Programming Interface (API) calls. In a specific embodiment, all API calls may use secured hypertext terminal protocol (HTTPS), as illustrated in FIG. 12.

As will be appreciated by one skilled in the art based on this disclosure, aspects of the present invention may be embodied as a system, method or computer program product. Accordingly, aspects of the present invention may take the form of an entirely hardware embodiment, a processor operating with software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++, C#, Transact-SQL, XML, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified.

These computer program instructions may also be stored in a computer readable medium that can direct a computer, other programmable data processing apparatus, or other devices to function in a particular manner, such that the instructions stored in the computer readable medium produce an article of manufacture including instructions which implement the functions/acts specified.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified.

Figure 13:
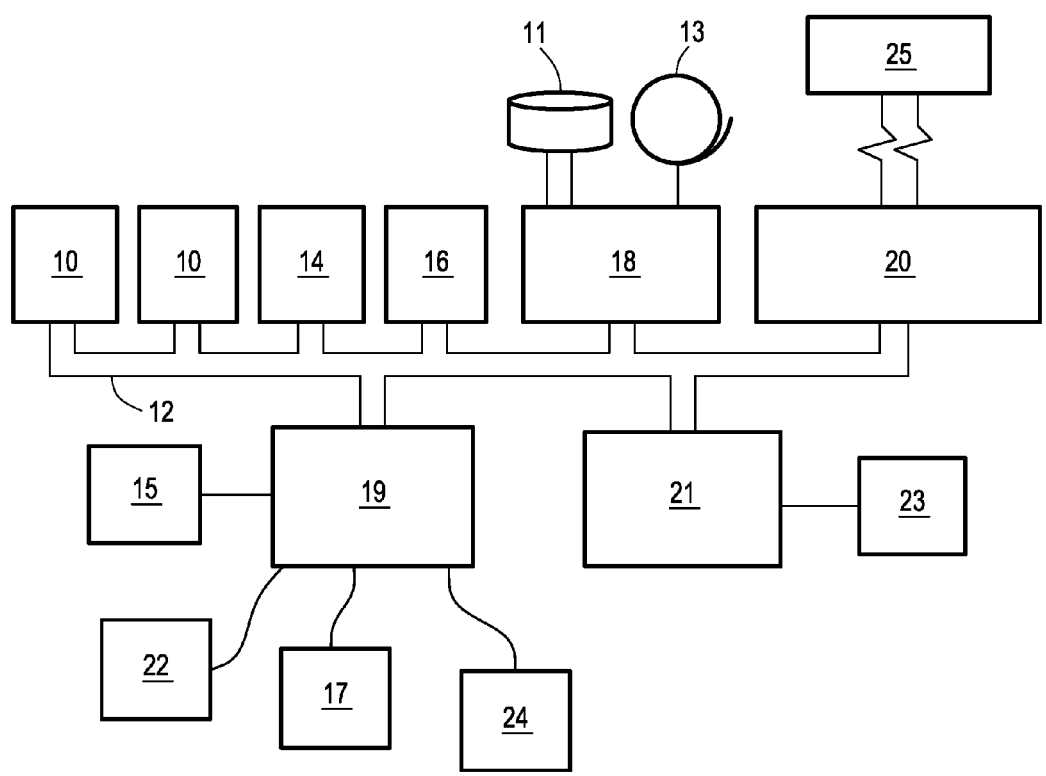
FIG. 13 shows a representative hardware environment for practicing at least one embodiment of the present invention.

Referring now to FIG. 13, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

As used herein, "in communication" includes physical and wireless connections that are indirect through one or more additional components (or over a network) or directly between the two components described as being in communication.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Figure 14:
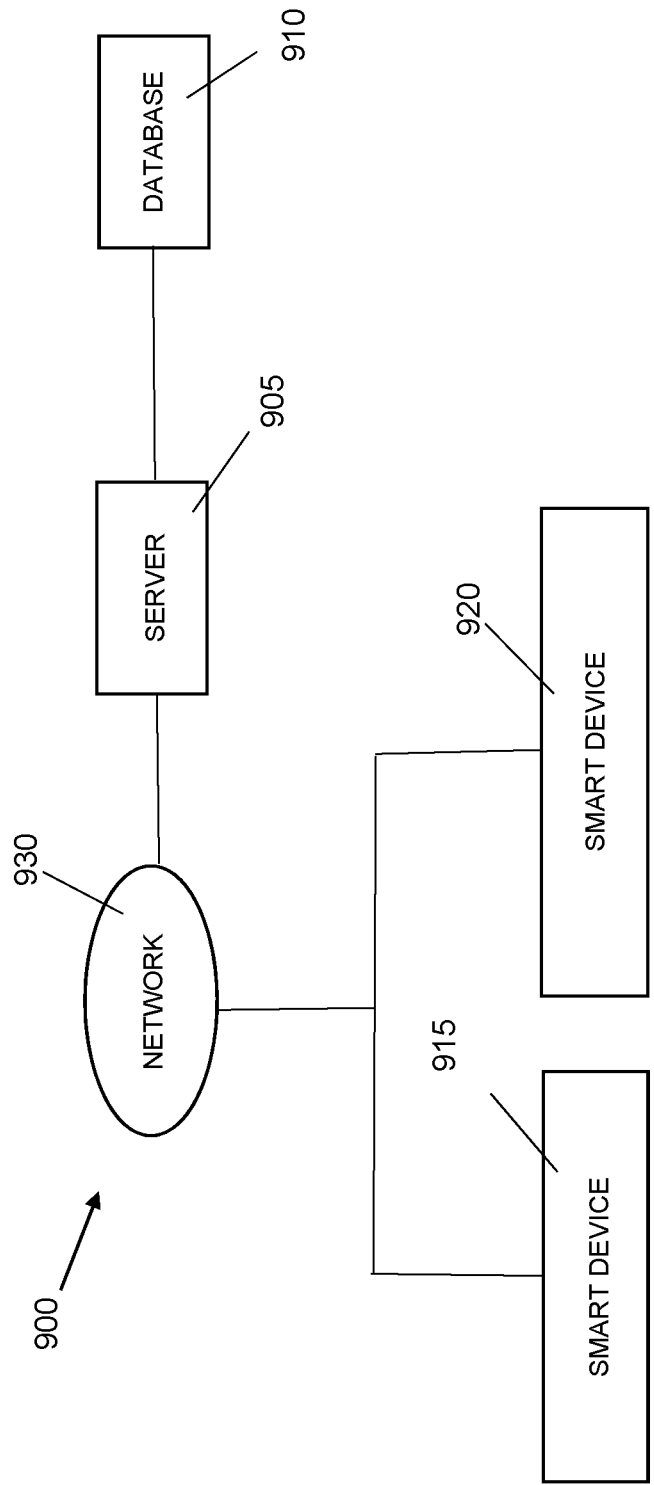
FIG. 14 shows a schematic diagram of a system according to an embodiment of the present invention.

FIG. 14 shows a schematic diagram of a system for providing a secure messaging environment according to an embodiment of the present invention. The system 900 includes a server 905 providing a messaging environment in which two or more devices (e.g., smart devices 915, 920) are connected via a network 930, each device having a client application that provides a graphical user interface for displaying messages within the messaging environment. The server 905 encrypts messages sent to the messaging environment. The server creates a continually-changing encryption key by encrypting 1) user-specific information or a user personal key and 2) a record ID for a stored encrypted message. At least one database 910 stores the encrypted messages from the server, with each message having a separate record ID.

As used above "substantially," "generally," "about", and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

What is claimed is:

1. A method for providing a secure messaging environment, comprising:
   providing a messaging environment in which two or more devices are connected via a network, each device having a client application that provides a graphical user interface for displaying messages within the messaging environment;
   logging-into the client application;
   encrypting user-specific information using a personal encryption key;
   creating a ticket, said ticket comprising a continuously-updated encryption key and an expiration setting from a server; and
   calling the server, said call comprising the ticket;
   wherein if said call comprises data to the messaging environment, said method further comprises:
      validating the ticket;
      storing and encrypting said data on a database by the continuously-updated encryption key
      updating the continuously-updated encryption key by encrypting the user-specific information or the personal encryption key and a record ID for the stored encrypted data; and
      displaying said data in the messaging environment and a client graphical user interface on a user device;
      forwarding the continuously-updated encryption key to the client application;
      creating a new ticket that incorporates the continuously-updated encryption key; and
      repeating the method for each call comprising data sent or received in the messaging environment.

2. A method according to claim 1, wherein the first personal encryption key does not change.

3. A method according to claim 1, wherein the user-specific information comprises a user ID, username, user role, or any combination thereof.

4. A method according to claim 1, wherein said expiration setting comprises a predefined setting comprising, a time period, a logout, closing and reopening of the Inbox or a specific folder/icon, losing a network connection between a client and the server, or any combination thereof.

5. A method according to claim 1, wherein said data comprises data files, text or word processing files, notes, text messages, voice messages or calls, photos, videos, lists, spreadsheets, web links, or webpages.

6. A method according to claim 1, wherein updating the continuously-updated encryption key comprises encrypting the personal encryption key and the record ID.

7. A method according to claim 1, wherein said record ID comprises at least one of a server ID, a network ID, a database ID, or any combination thereof.

8. A method according to claim 1, further comprising clearing data from the messaging environment.

9. A method according to claim 8, wherein said clearing data comprises removing encrypted data from the server or database and updating the server and the second encryption key.

10. A method according to claim 8, wherein said cleared data is cleared from the messaging environment and server at the same time is not recoverable.

11. A method according to claim 1, further comprising indexing said encrypted data.

12. A method according to claim 11, further comprising conducting real-time search of a messaging environment, said server searching saved encrypted data corresponding to a search query.

13. A method according to claim 1, wherein said devices are selected from the group consisting of a tablet computer, a smartphone, a gaming device, and a wearable device.

14. A method for providing a secure messaging environment, comprising:
   providing a messaging environment in which two or more devices are connected via a network, each device having a client application that provides a graphical user interface for displaying data within the messaging environment;
   creating a ticket, said ticket comprising a continuously-updated encryption key from a server;
   transmitting data to the messaging environment, wherein said data comprises data files, text or word processing files, notes, text messages, voice messages or calls, photos, videos, lists, spreadsheets, web links, or webpages;
   storing and encrypting said data on a database by the continuously-updated encryption key;
   updating the continuously-updated encryption key with each transmission of data to the messaging environment by encrypting 1) user-specific information or a user personal key and 2) a record ID for the stored data;
   displaying said data in the messaging environment and a client graphical user interface on a user device;
   forwarding the continuously-updated key to the client application; and
   creating a new ticket that incorporates the continuously-updated encryption key, thereby providing a continually-encrypted exchange of data in the messaging environment.

15. A method according to claim 14, further comprising clearing data from the messaging environment by removing selected encrypted data from the server and updating the server and the second continuously-updated encryption key corresponding to the selected encrypted data.

16. A computer program product for providing a secure messaging environment, comprising:
   a non-transitory computer readable storage medium;
   first program instructions to provide a messaging environment in which two or more devices are connected via a network, each device having a client application that provides a graphical user interface for displaying messages within the messaging environment;
   second program instructions to log into the client application;
   third program instructions to encrypt user-specific information using a personal encryption key;
   fourth program instructions to create a ticket, said ticket comprising a continuously-updated key from a server;

fifth program instructions to call the server, said call comprising the ticket and a target method, wherein said call comprises data to the messaging environment sixth program instructions to:
  validate the ticket;
  store and encrypt said data on a database with the continuously-updated key;
  create the continuously-updated key by encrypting the user-specific information and a record ID for the stored encrypted data; and
  display said data in the messaging environment and a client graphical user interface on a user device, thereby providing a continually-encrypted exchange of messages in the messaging environment;

seventh program instructions to forward the continuously-updated key to the client application;

eighth program instructions to create a new ticket that incorporates the continuously-updated key; and ninth program instructions to repeat the method for each call comprising data sent or received in the messaging environment, wherein the first, second, third, fourth, fifth, sixth, seventh, eighth, and ninth program instructions are stored on said non-transitory computer readable storage medium.

* * * * *